US011458538B2

(12) United States Patent
Chen et al.

(10) Patent No.: US 11,458,538 B2
(45) Date of Patent: Oct. 4, 2022

(54) GENERAL SYNTHETIC STRATEGY FOR FABRICATION OF MULTI-METALLIC NANOSTRUCTURES

(71) Applicant: HONDA MOTOR CO., LTD., Tokyo (JP)

(72) Inventors: Shutang Chen, Powell, OH (US); Gugang Chen, Powell, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 140 days.

(21) Appl. No.: 16/195,561

(22) Filed: Nov. 19, 2018

(65) Prior Publication Data

US 2020/0156157 A1    May 21, 2020

(51) Int. Cl.
*B22F 9/16* (2006.01)
*B22F 1/054* (2022.01)
*B82Y 40/00* (2011.01)
*B82Y 30/00* (2011.01)

(52) U.S. Cl.
CPC ............... *B22F 9/16* (2013.01); *B22F 1/054* (2022.01); *B22F 1/0549* (2022.01); *B22F 2301/10* (2013.01); *B22F 2301/255* (2013.01); *B82Y 30/00* (2013.01); *B82Y 40/00* (2013.01)

(58) Field of Classification Search
None
See application file for complete search history.

(56) References Cited

U.S. PATENT DOCUMENTS

| 2004/0118698 | A1* | 6/2004 | Lu ............................ C25D 5/48 205/224 |
| 2005/0056118 | A1 | 3/2005 | Xia et al. |
| 2005/0186151 | A1* | 8/2005 | Giroud .................... A61K 8/046 424/59 |
| 2007/0212562 | A1* | 9/2007 | Shim ....................... B22F 1/025 428/548 |
| 2009/0214956 | A1* | 8/2009 | Prieto ................. H01M 10/052 429/310 |

(Continued)

FOREIGN PATENT DOCUMENTS

| CN | 1868640 A | 11/2006 |
| CN | 101024246 A | 8/2007 |

(Continued)

OTHER PUBLICATIONS

Chen, Jingyi, et al., Optical Properties of Pd—Ag and Pt—Ag Nanoboxes Synthesized via Galvanic Replacement Reactions, Nano Letters, vol. 5, No. 10, pp. 2058-2062, 2005.

(Continued)

*Primary Examiner* — George Wyszomierski
(74) *Attorney, Agent, or Firm* — ArentFox Schiff LLP; Mark Duell

(57) ABSTRACT

A method for preparing a hollow multi-metallic nanostructure, the method including the steps of providing a first metal nanostructure having a plurality of first metal atoms, and performing a synthetic strategy, the synthetic strategy including replacing a portion of the plurality of first metal atoms with a corresponding number of second metal ions, and promoting first metal atom diffusion to provide the hollow multi-metallic nanostructure.

8 Claims, 14 Drawing Sheets
(11 of 14 Drawing Sheet(s) Filed in Color)

(56) References Cited

U.S. PATENT DOCUMENTS

| | | | | |
|---|---|---|---|---|
| 2010/0177462 | A1* | 7/2010 | Adzic | B82Y 30/00 361/502 |
| 2011/0143263 | A1* | 6/2011 | Shirvanian | H01M 4/8807 429/523 |
| 2012/0316060 | A1* | 12/2012 | Shao | H01M 4/921 502/330 |
| 2014/0147756 | A1* | 5/2014 | Co | H01M 4/8657 429/405 |
| 2015/0236355 | A1 | 8/2015 | Yang et al. | |
| 2016/0082418 | A1* | 3/2016 | Qin | B01J 37/0225 502/330 |
| 2016/0126562 | A1* | 5/2016 | Pivovar | H01M 4/9041 502/326 |
| 2018/0214943 | A1 | 8/2018 | Xia et al. | |
| 2018/0221961 | A1* | 8/2018 | Bakr | F27D 1/00 |
| 2018/0331371 | A1* | 11/2018 | Sugimoto | H01M 4/8657 |

FOREIGN PATENT DOCUMENTS

| | | |
|---|---|---|
| CN | 103673684 A | 3/2014 |
| CN | 108877992 A | 11/2018 |
| JP | 2004131780 A | 4/2004 |
| JP | 2015206102 A | 11/2015 |
| KR | 20170026689 * | 3/2017 |

OTHER PUBLICATIONS

Chen, Shutang, et al., "Anistropic Seeded Growth of Cu—M (M = Au, Pt, or Pd) Bimetallic Nanorods with Tunable Optical and Catalytic Properties," The Journal of Physical Chemistry, 117, pp. 8924-8932, 2013.

Gilroy, Kyle D., et al., "Bimetallic Nanocrystals: Syntheses, Properties, and Applications," Chemical Reviews, ACS Publications, Chem. Rev. 2016, 116, pp. 10414-10472.

Kobayashi, Hirokazu, "Double enhancement of hydrogen storage capacity of Pd nanoparticles by 20 at% replacement with Ir systematic control of hydrogen storage in Pd—M nanoparticles (M = Ir, Pt, Au)," Chemical Science, Edge Article, The Royal Society of Chemistry, 2018.

Li, Guangfang Grace, et al., "Galvanic Replacement-Driven Transformations of Atomically Intermixed Bimetallic Colloidal Nanocrystals: Effects of Compositional Stoichiometry and Structural Ordering," Langmuir, 34, pp. 4340-4350, 2018.

Lu, Xianmao, et al., "Mechanistic Studies on the Galvanic Replacement Reaction between Multiply Twinried Particles of Ag and HAuCl4 in an Organic Medium," JACS Articles, 129, pp. 1733-1742, 2007.

Mathurin, Leanne E., et al., Tailoring the Surface Structures of CuPt arid CuPtRu 1D Nanostructures by Coupling Coreduction with Galvanic Replacement, Full Paper, Metal Nanostructures, 1800053, 2018.

Mohl, Melinda, et al., "Formation of CUPd and CuPt Bimetallic Nanotubes by Galvanic Replacement Reaction," The Journal of Physical Chemistry, 115, pp. 9403-9409, 2011.

Okada, Michio, et al., "Experimental and Theoretical Studies on Oxidation of Cu—Au Alloy Surfaces: Effect of Bulk Au Concentration," Scientific Reports, Aug. 12, 2016.

Thota, S., et al., "An unconventional mechanism of hollow nanorod formation: asymmetric Cu diffusion in Au—Cu alloy nanorods during galvanic replacemetn reaction," ChemComm, Communication, 52, pp. 5593-5596, 2016.

Zhang, Lei, et al., "Platinum-based nanocages with subnanometer-thick walls and well-defined, controllable facets," Nanocatalysts, vol. 349, Issue 6246, Jul. 24, 2015.

Notice of Reasons for Rejection issued by the Japanese Patent Office corresponding to Japanese Application No. 2019-200292, dated Nov. 4, 2020.

Search Report dated Mar. 9, 2022, issued by Chinese Patent Office in related Chinese Application No. 2019110705637.

Communication dated Mar. 17, 2022, issued by the German Patent Office in related German Patent Application No. 10 2019 130 263.3.

Liu, Yonglin, et al., "Facile One-Pot Synthesis of Metal-Semiconductor Hybrid Nanocrystals via Chemical Transformation: The Case of Cu-CUxS Heterodimers and Hetero-Oligomers", 3. Phys. Chem. C, vol. 114, No. 10, pp. 2464-4271, 2010.

Liu, Yonglin, et al., "Preferential Outward Diffusion of Cu during Unconventional Galvanic Replacement Reactions between HAuCl4 and Surface-Limited Cu Nanocrystals", ACSNANO, vol. 5, No. 9, pp. 6843-6854, 2011.

Liu, Zhaoping, et al., "Synthesis of Copper Nanowires via a Complex-Surfactant-Assisted Hydrothermal Reduction Process", J. Phys. Chem. B, vol. 107, No. 46, p. 12658-12661, 2003.

* cited by examiner

GENERAL SYNTHETIC STRATEGY FOR FABRICATION OF MULTI-METALLIC NANOSTRUCTURES

TECHNICAL FIELD

The present disclosure is directed to a method for producing hollow multi-metallic nanostructures.

BACKGROUND OF THE DISCLOSURE

Multi-metallic hollow nanostructures are promising new candidates in biomedicine, fuel cells, and gas sensors due to their porous structures and possible synergistic effects between the two or more metals. However, known methods for synthesizing such nanostructures generally involve individualized synthetic methods. Although a few general methods are known, such methods are generally limited to noble metals, such as silver or palladium, both of which are expensive when compared with other metals, such as copper. There is thus a need in the art for a general synthetic strategy for preparing multi-metallic nanostructures.

BRIEF DESCRIPTION OF THE DISCLOSURE

The present disclosure is directed generally to a method for preparing hollow multi-metallic two-dimensional nanostructures. The method may comprise providing a first metal nanostructure, replacing a portion of the first metal atoms comprised by the first metal nanostructure with a corresponding number of second metal ions, and promoting first metal atom diffusion to provide a hollow nanostructure. According to some aspects, the method may comprise a one-step synthetic strategy. The present disclosure is also directed to hollow multi-metallic two-dimensional nanostructures provided by the present method.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE DISCLOSURE

Figure 1:
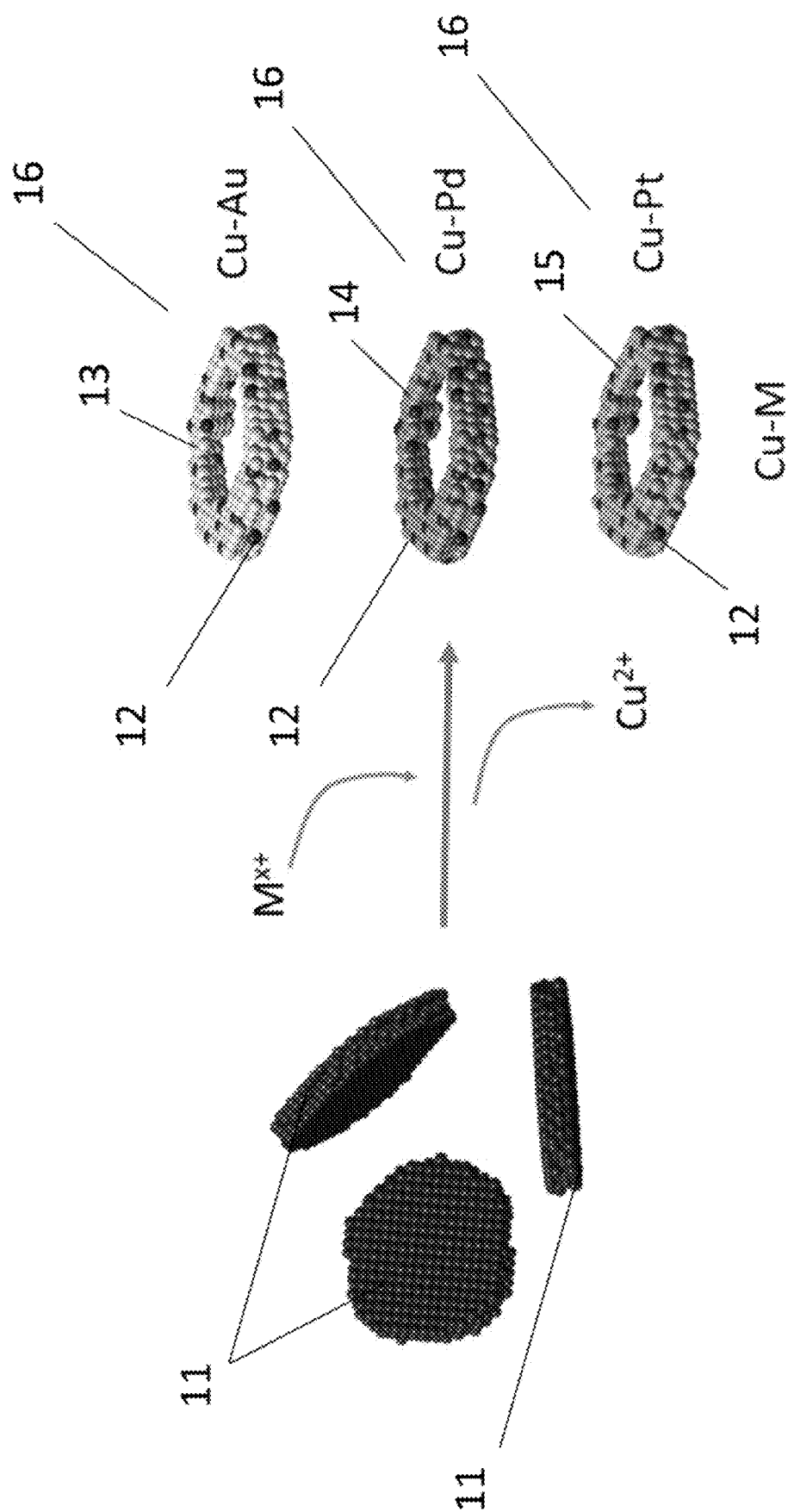
FIG. 1 shows an example schematic of the method according to aspects of the present disclosure.

The present disclosure is directed generally to a method for preparing hollow multi-metallic nanostructures. The method may comprise providing a first metal nanostructure, replacing a portion of the first metal atoms comprised by the first metal nanostructure with a corresponding number of second metal ions, and promoting first metal atom diffusion to provide a hollow nanostructure. According to some aspects, the method may comprise a one-step synthetic strategy. The present disclosure is also directed to hollow multi-metallic nanostructures provided by the present method. Optionally, the nanostructures may be two dimensional.

As used herein, the term "nanostructure" refers to a structure having at least one dimension on the nanoscale, that is, at least on dimension between about 0.1 and 100 nm. It should be understood that "nanostructures" include, but are not limited to, nanosheets, nanotubes, nanoparticles (e.g., polyhedral nanoparticles), nanospheres, nanowires, nanocubes, and combinations thereof. A nanosheet may comprise a sheet having a thickness on the nanoscale. A nanotube may comprise a tube having a diameter on the nanoscale. A nanoparticle may comprise a particle wherein each spatial dimension thereof is on the nanoscale. According to some aspects, the first metal nanostructure and the hollow multi-metallic two-dimensional nanostructures may be the same or different.

According to some aspects, the method may comprise providing a first metal nanostructure, such as a first metal nanosheet. It should be understood that the first metal nanostructure may be provided by any means known in the art compatible with the present disclosure.

For example, according to some aspects, the first metal nanostructure may comprise a copper nanosheet. According to some aspects, the copper nanosheet may be provided using a copper complex solution. According to some aspects, the copper complex solution may comprise one or more copper complexes. As used herein, the term "copper complex" refers to a complex of copper and one or more complexing agents. Complexing agents useful according to the present disclosure include, but are not limited to, tetradecylamine (TDA), dodecylamine (DDA), hexadecylamine (HAD), octadecylamine (ODA), and oleylamine (OLA). According to some aspects, the copper complex may be provided by combining one or more copper atoms and/or salts thereof with one or more complexing agents in a solution under an inert atmosphere and stirring for an acceptable length of time at an acceptable temperature. For example, the copper complex may be provided by combining a copper salt and one or more complexing agents in a solution under an inert gas flow. Examples of inert gases include, but are not limited to, nitrogen gas, argon gas, and combinations thereof. The combined solution may then be heated to a temperature of between about 100 and 300° C. from about one minute to about one hour to provide a copper complex solution comprising the copper complex.

According to some aspects, the copper nanosheet may be provided by heating the copper complex solution. For example, the copper nanosheet may be provided by combining the copper complex solution with one or more ligands at an elevated temperature under an inert atmosphere for an acceptable length of time. For example, the copper nanosheet may be provided by combining the copper complex solution with a ligand under an inert atmosphere at an elevated temperature of between about 100 and 500° C., optionally between about 200 and 400° C., and optionally about 300° C. The combined solution may be held at the elevated temperature for a time of between about one minute and two hours, optionally between about thirty and ninety minutes, and optionally about one hour, to provide a copper nanosheet solution containing the copper nanosheets. Examples of ligands include, but are not limited to, oleylamine, trioctylphosphine, tetradecylamine, dodecylamine, octadecylamine, hexadecylamine, trioctylphosphine oxide, oleic acid, and combinations thereof.

It should be understood that the first metal atoms comprised by the first metal nanostructure (for example, copper atoms comprised by copper nanosheets) will have a first oxidation potential. As used herein, the term "oxidation potential" refers to the energy change required to remove electrons from a material. It should be understood that copper, for example, may have an oxidation potential of about 0.34 V. According to some aspects, the first metal may be a metal with a first oxidation potential of no more than about 1.0 V, optionally no more than about 0.5 V. According to some aspects, the first metal may be selected from the group consisting of copper (Cu), nickel (Ni), cobalt (Co), iron (Fe), and combinations thereof.

According to some aspects, the method may comprise replacing a portion of the first metal atoms comprised by the first metal nanostructure with a corresponding number of second metal ions. According to some aspects, the second metal may comprise a metal having a second oxidation potential, wherein the second oxidation potential is greater than the first oxidation potential. Examples of metals useful according to the present disclosure include, but are not limited to, gold (Au), platinum (Pt), palladium (Pd), and combinations thereof. According to some aspects, the second oxidation potential may be about 1.40 V ($Au^{3+}/Au$), about 1.20 V ($Pt^{2+}/Pt$), and/or about 0.92 V ($Pd^{2+}/Pd$). According to some aspects, the second oxidation potential may be at least about 0.6 V greater than the first oxidation potential, optionally about 0.7 V greater, optionally about 0.8 V greater, optionally about 0.9 V greater, and optionally about 1.0 V greater. According to some aspects, the first metal is different from the second metal.

According to some aspects, replacing a portion of the first metal atoms comprised by the first metal nanostructure with a corresponding number of second metal ions may comprise combining a first metal nanostructure solution with a metal precursor solution. As used herein, the term "first metal nanostructure solution" refers to a solution comprising the first metal nanostructure as described herein. As used herein, the term "metal precursor solution" refers to a solution comprising a metal-containing compound and/or hydrates thereof. Examples of metal compounds include, but are not limited to, chloroauric acid ($HAuCl_4$), palladium(II) acetylacetonate ($Pd(acac)_2$), chloroplatinic acid ($H_2PtCl_6$), combinations thereof, and hydrates thereof. According to some aspects, the first metal nanostructure solution may be combined with the metal precursor solution at a temperature suitable for the second metal ions to replace a corresponding number of first metal ions. For example, the first metal nanostructure solution may be combined with the metal precursor solution at an elevated temperature of between about 10 and 200° C., optionally between about 50 and 180° C., optionally between about 80 and 180° C., and optionally between about 80 and 150° C.

According to some aspects, the concentration and/or amount of the first metal nanostructure solution and/or the metal precursor solution may be selected in order to provide a combined solution having at least an initial molar ratio of first metal atoms to second metal ions from about 5:1 to about 1:5, optionally from about 4:1 to 1:4, and optionally from about 3:1 to 1:3.

According to some aspects, the molar ratio of first metal atoms to second metal ions may be selected in order to provide a selected composition and phase of the resulting hollow multi-metallic two-dimensional nanostructure. In particular, according to some aspects, the reaction rate of galvanic replacement may increase with an increased concentration of metal precursor. As such, the reaction rate of galvanic replacement may be selected by selecting a certain molar ratio of first metal atoms to second metal ions in the combined solution.

The combined first metal nanostructure and metal precursor solution may be held at the elevated temperature for a synthesis time of between about 1 minute and 3 hours, optionally between about 20 minutes and 2 hours, and optionally about 1 hour, such that a portion of the first metal atoms comprised by the first metal nanostructure is replaced with a corresponding number of second metal ions. According to some aspects, the synthesis time may be selected in order to provide a selected composition and phase of the resulting hollow multi-metallic two-dimensional nanostructure. For example, a longer synthesis time (e.g., 20 minutes) may result in a hollow multi-metallic two-dimensional nanostructure having a molar ratio of first metal atoms to second metal atoms of about 1:1, whereas a shorter synthesis time (e.g., less than 5 minutes) may result in a hollow multi-metallic two-dimensional nanostructure having a molar ratio of first metal atoms to second metal atoms of about 3:1. Because the concentration of first metal atoms comprised by the nanostructure may decrease with an increased reaction time, when the reaction time prolongs to 40 minutes, the molar ratio of first metal to second metal atoms may reduce to 1:3. The final molar ratio of first metal to second metal atoms may reach 1:8 with a reaction time of 60 minutes.

According to some aspects, the portion of replaced first metal ions may comprise first metal ions located at or near the surface of the first metal nanostructure. Without wishing to be bound by a particular theory, because the first oxidation potential is less than the second oxidation potential, first metal atoms at or near a nanostructure's surface may be replaced with second metal ions due to galvanic replacement.

According to some aspects, the method may comprise promoting first metal atom diffusion to provide hollow multi-metallic two-dimensional nanostructures. Without wishing to be bound by a particular theory, the hollow multi-metallic two-dimensional nanostructures may be provided by the Kirkendall effect, wherein first metal atoms interior to the first metal nanostructure diffuse to the exterior of the nanostructure. As used herein, the term "exterior" refers to a position at and/or near the surface of the nanostructure. The term "interior" refers to a position away from the surface of the nanostructure. It should be understood that the hollow multi-metallic two-dimensional nanostructures may comprise, for example, a continuous hollow center (i.e., wherein the hollow center spans from one side of the nanostructure to another to form, e.g., a ring- or tube-shaped nanostructure) and/or may comprise a hollow core (i.e., wherein the hollow center does not span from one side of the nanostructure to another, and instead forms an indent-shaped center in the nanostructure or a hollow center that is not visible from the outside of the nanostructure).

According to some aspects, one or more of the other method steps as described herein may sequentially and/or simultaneously promote first metal atom diffusion. For example, combining the first metal nanostructure solution and the metal precursor solution at an elevated temperature suitable for the second metal ions to replace a corresponding number of first metal ions and holding the combined solution at the elevated temperature, as described herein, may sequentially and/or simultaneously replace a portion of the first metal atoms comprised by the first metal nanostructure with a corresponding number of second metal ions and promote first metal atom diffusion.

According to some aspects, the method may comprise a one-step synthetic strategy. As used herein, the term "one-step synthetic strategy" refers to a synthetic strategy wherein at least a first reactant is converted to a reaction product in a single synthesis step. For example, as described herein, the first metal nanostructure may be converted to the hollow multi-metallic two-dimensional nanostructure in a single synthesis step, in particular, combining the first metal nanostructure solution and the metal precursor solution at the elevated temperature and holding the combined solution at the elevated temperature for a certain length of time.

FIG. 1 shows an example schematic of the method according to aspects of the present disclosure. As shown in FIG. 1, the method may comprise providing one or more first metal nanostructures, for example, one or more copper nanosheets 11. The method may comprise replacing a portion of the copper atoms 12 comprised by the copper nanosheet with a corresponding number of second metal ions, such as Au ions 13, Pd ions 14, and/or Pt ions 15. As described herein, replacing a portion of the copper atoms 12 comprised by the copper nanosheet with a corresponding number of second metal ions may comprise combining a solution containing the one or more copper nanosheets 11 with a metal precursor solution at an elevated temperature for a certain period of time. As described herein, carbon atoms may sequentially and/or simultaneously diffuse to provide the hollow multi-metallic two-dimensional nanostructures 16 as described herein.

According to some aspects, the method may further comprise one or more washing steps. The washing step may comprise centrifuging the solution containing the hollow multi-metallic two-dimensional nanostructures, removing the supernatant, combining with a solvent such as a hydrophobic solvent and/or an organic solvent, and centrifuging the combined solution. The method may comprise one, two, three, or more washing steps.

It should be understood that the term "multi-metallic" as used herein refers to at least two different metals. According to some aspects, the hollow multi-metallic two-dimensional nanostructure may be a hollow bimetallic two-dimensional nanostructure, that is, wherein the only metal atoms comprised by the nanostructure are the first and second metal atoms. However, according to some aspects, the hollow multi-metallic two-dimensional nanostructure may comprise three, four, five, or more different kinds of metal atoms.

The present disclosure is also directed to hollow multi-metallic two-dimensional nanostructures provided by the present method, including, but not limited to, Cu—Au hollow nanostructures, Cu—Pd hollow nanostructures, Cu—Pt hollow nanostructures. According to some aspects, the molar ratio of the first metal to the second metal atoms in the hollow multi-metallic two-dimensional nanostructure may be from about 10:1 to 1:10, optionally from about 5:1 to 1:5, optionally from about 3:1 to 1:3, optionally from about 2:1 to 1:2, optionally from about 1.5:1 to 1:1.5, and optionally about 1:1.

The present disclosure is also directed to methods of using the hollow multi-metallic two-dimensional nanostructures as described herein. According to some aspects, the method may comprise utilizing the hollow multi-metallic two-dimensional nanostructures in the production of gas sensors and/or use of the resulting gas sensors. According to some aspects, the method may comprise using the hollow multi-metallic two-dimensional nanostructures to, at least in part, catalyze $CO_2$ reduction reactions.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

As used herein, the term "about" and "approximately" are defined to being close to as understood by one of ordinary skill in the art. In one non-limiting embodiment, the term "about" and "approximately" are defined to be within 10%, preferably within 5%, more preferably within 1%, and most preferably within 0.5%.

EXAMPLES

Example I: Preparation of Copper Complex Solution 100 mg of copper (I) chloride (99.99%). 220 mg of tetradecylamine (TDA.>96%), and 2 mL of ODE were added into a flask where oxygen was removed under Ar or $N_2$ flow. After Ar or $N_2$ blowing for 20 minutes, the mixed solution was heated to 190° C. on a hot plate and kept at this temperature for 30 minutes. During the heating process, TDA was melted at about 38 to 40° C. and coordinated with Cu atoms to form a Cu-TDA blue complex solution.

Example II(a): Synthesis of Cu—Au Hollow Nanostructures 6.0 mL of OLA (70%) was loaded into a 25 mL three-neck flask where oxygen was removed through Ar blowing for 10 minutes. Under Ar flow, 0.5 mL of TOP (97%) and 0.5 mL of TOP (90%) were injected into the flask, respectively. After 10 minutes of Ar flowing, the flask was rapidly heated to 300° C. Next, 2 mL of the copper complex solution prepared in Example I was quickly injected into the hot flask and the reaction solution turned to red within 5-10 minutes, which indicated that copper nanosheets had formed. The reaction was held at 300° C. for 60 minutes. The reaction mixture was then naturally cooled to 120° C., and 1.0 mL of gold precursor solution (0.1 M, 39.3 mg of $HAuCl_4.3H_2O$ dissolved in 1.0 mL of oleylamine) was injected. The reaction solution was kept at 120° C. for 60 minutes. The products were separated by centrifuging at 8000 rpm for 5 minutes. The supernatant was discarded. A mixed solution of 5 mL of hexane (or another hydrophobic solvent such as toluene or chloroform) and 5 mL of ethanol was then added to the sediment, and the mixture was centrifuged at 8000 rpm for 5 minutes. The washing procedure was repeated twice to remove unreacted precursors and surfactant. The Cu—Au hollow nanostructures were stored in hydrophobic solvents (e.g., hexane, toluene, and chloroform) before characterization.

It was concluded that the injected gold precursor solution may be from 0.2 mL to 3.0 mL, the injection temperature of gold precursor solution may be from 80° C. to 150° C., and the reaction time after injecting the gold precursor solution may be from 20 to 120 minutes to provide acceptable results.

Example II(b): Synthesis of Cu—Pd Hollow Nanostructures 6.0 mL of OLA (70%) was loaded into a 25 mL three-neck flask where oxygen was removed through Ar blowing for 10 minutes. Under Ar flow, 0.5 mL of TOP (97%) and 0.5 mL of TOP (90%) were injected into the flask, respectively. After 10 minutes of Ar flowing, the flask was rapidly heated to 300° C. Next, 2 mL of the copper complex solution prepared in Example I was quickly injected into the hot flask and the reaction solution turned to red within 5-10 minutes, which indicated that copper nanosheets had formed. The reaction was held at 300° C. for 60 minutes. The reaction mixture was then naturally cooled to 150° C. and 1.0 mL of gold precursor solution (0.1 M, 30.4 mg of $Pd(acac)_2$ dissolved in 1.0 mL of oleylamine) was injected. The reaction solution was kept at 150° C. for 60 minutes. The products were separated by centrifuging at 8000 rpm for 5 minutes. The supernatant was discarded. A mixed solution of 5 mL of hexane (or another hydrophobic solvent such as toluene or chloroform) and 5 mL of ethanol was then added to the sediment, and the mixture was centrifuged at 8000 rpm for 5 minutes. The washing procedure was repeated twice to remove unreacted precursors and surfactant. The Cu—Pd hollow nanostructures were stored in hydrophobic solvents (e.g., hexane, toluene and chloroform) before characterization.

It was concluded that the injected palladium precursor solution may be from 0.2 mL to 3.0 mL, the injection temperature of palladium precursor solution may be from 80° C. to 180° C., and the reaction time after injecting the gold precursor solution may be from 20 to 120 minutes to provide acceptable results.

Example II(c): Synthesis of Cu—Pt Hollow Nanostructures 6.0 mL of OLA (70%) was loaded into a 25 mL three-neck flask where oxygen was removed through Ar blowing for 10 minutes. Under Ar flow, 0.5 mL of TOP (97%) and 0.5 mL of TOP (90%) were injected into the flask, respectively. After 10 minutes of Ar flowing, the flask was rapidly heated to 300° C. Next, 2 mL of the copper complex solution prepared in Example I was quickly injected into the hot flask and the reaction solution turned to red within 5-10 minutes, which indicated that copper nanosheets had formed. The reaction was held at 300° C. for 60 minutes. The reaction mixture was then naturally cooled to 120° C. and 1.0 mL of platinum precursor solution (0.1 M, 51.7 mg of $H_2PtCl_6 \cdot 6H_2O$ dissolved in 1.0 mL of oleylamine) was injected. The reaction solution was kept at 120° C. for 60 minutes. The products were separated by centrifuging at 8000 rpm for 5 minutes. The supernatant was discarded. A mixed solution of 5 mL of hexane (or another hydrophobic solvent such as toluene or chloroform) and 5 mL of ethanol was then added to the sediment, and the mixture was centrifuged at 8000 rpm for 5 minutes. The washing procedure was repeated twice to remove unreacted precursors and surfactant. The Cu—Pt hollow nanostructures were stored in hydrophobic solvents (e.g., hexane, toluene and chloroform) before characterization.

It was concluded that the injected platinum precursor solution may be from 0.2 mL to 3.0 mL, the injection temperature of platinum precursor solution may be from 80° C. to 150° C., and the reaction time after injecting the platinum precursor solution may be from 20 to 120 minutes to provide acceptable results.

Example II(d): Synthesis of Cu—Au Hollow Nanostructures 6.0 mL of OLA (70%) was loaded into a 25 mL three-neck flask where oxygen was removed through Ar blowing for 10 minutes. Under Ar flow, 0.2 mL of TOP (97%) was injected into the flask. After 10 minutes of Ar flowing, the flask was rapidly heated to 300° C. Next, 2 mL of the copper complex solution prepared in Example I was quickly injected into the hot flask and the reaction solution turned to red within 5-10 minutes, which indicated that copper nanosheets had formed. The reaction was held at 300° C. for 20 minutes. The reaction mixture was then naturally cooled to 120° C. and 1.0 mL of gold precursor solution (0.1 M, 50.7 mg of $HAuCl_4 \cdot 3H_2O$ dissolved in 1.0 mL of oleylamine) was injected. The reaction solution was kept at 120° C. for 60 minutes. The products were separated by centrifuging at 8000 rpm for 5 min. The supernatant was discarded. A mixed solution of 5 mL of hexane (or another hydrophobic solvent such as toluene or chloroform) and 5 mL of ethanol was then added to the sediment, and the mixture was centrifuged at 8000 rpm for 5 minutes. The washing procedure was repeated twice to remove unreacted precursors and surfactant. The Cu—Au hollow nanostructures were stored in hydrophobic solvents (e.g., hexane, toluene and chloroform) before characterization.

It was concluded that the injected gold precursor solution may be from 0.2 mL to 3.0 mL, the injection temperature of gold precursor solution may be from 80° C. to 150° C., and the reaction time after injecting the gold precursor solution may be from 20 to 120 minutes to provide acceptable results.

Example III: Characterization of Hollow Nanostructures

The surface morphologies of the hollow nanostructures obtained in Example II were investigated by a scanning electron microscope (SEM, QUANTA FEG 650) from FEI with a field emitter as the electron source. Transmission electron microscopy (TEM) images were captured using an FEI Tecnai 20 microscope with an accelerating voltage of 200 kV. Energy Dispersive X-Ray spectrometer (EDS) mapping image and the high-angle annular dark-field (HAADF) image were collected by employing the probe-corrected Titan³™ 80-300 S/TEM with an accelerating voltage of 300 kV. A UV-Vis-NIR spectrometer (Cary 5000) was used to record the extinction spectra of the hollow nanostructures. A Bruker D8 Advance X-ray diffractometer with Cu Kα radiation operated at a tube voltage of 40 kV and a current of 40 mA was used to obtain X-ray diffraction (XRD) patterns. The surface composition of Cu nanosheets was detected by employing X-ray photoelectron spectroscopy (XPS, Kratos Axis). The instrument was equipped with monochromated (Al Kα) X-ray guns. Calculation of the binding energy was carried out by calibrating the binding energy of the C 1 s peak to 284.6 eV.

FIGS. 2-7 show the structural and compositional characterization of Cu—Au two-dimensional nanostructures prepared according to Example II(a).

Figure 2:
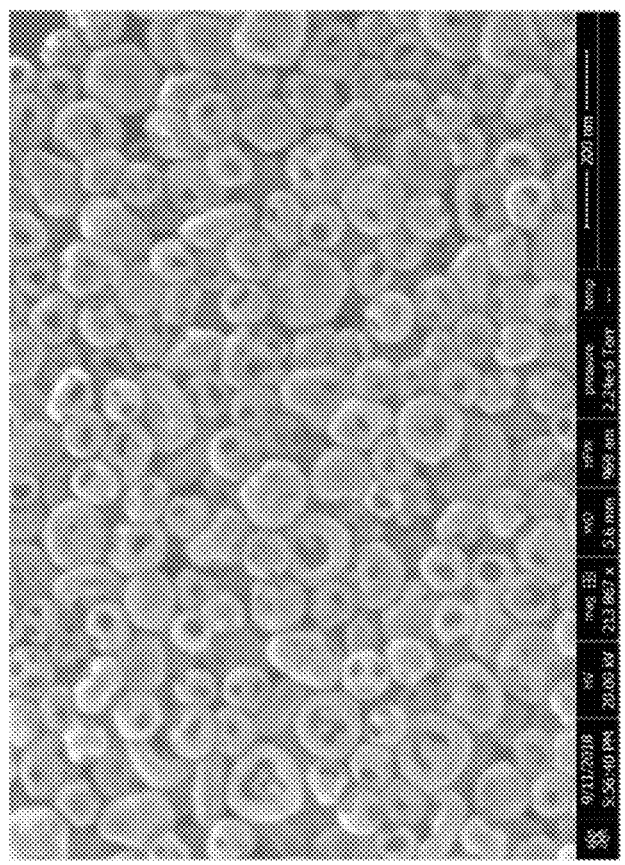
FIG. 2 shows a scanning electron microscopy (SEM) image of the hollow Au—Cu two-dimensional nanostructure prepared according to Example II(a).

From the scanning electron microscopy (SEM) image in FIG. 2, it is clear that the hollow Au—Cu two-dimensional nanostructures have an average diameter of 75 nm. Because the galvanic replacement reaction does not change the size of Cu nanosheets, based on the size range of prepared Cu nanosheets from 45 nm to a few micrometers, similar size range of Cu—Au hollow two-dimensional nanostructures can also be obtained. It was determined that the galvanic replacement reaction is impacts the formation of the hollowness. Because the potential of $Au^{3+}/Au$ (1.40 V) is higher than that of $Cu^{2+}/Cu$ (0.34 V), this reaction, $2Au^{3+} + 3Cu \rightarrow 2Au + 3Cu^2$, will spontaneously occur. The replacement of Cu atoms thus leads to the formation of the hollow nanostructures.

Figure 3:
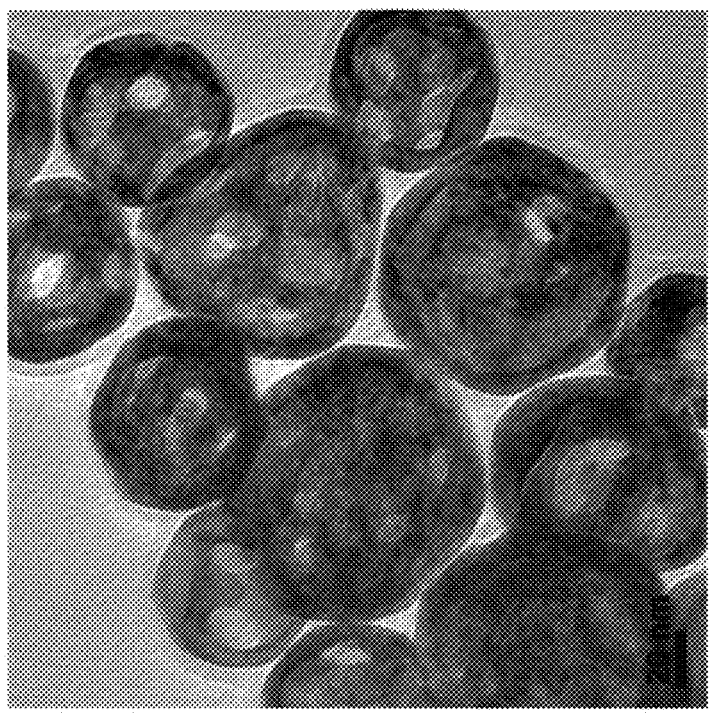
FIG. 3 shows a transmission electron microscopy (TEM) image of the hollow Au—Cu two-dimensional nanostructure prepared according to Example II(a).
Figure 5:
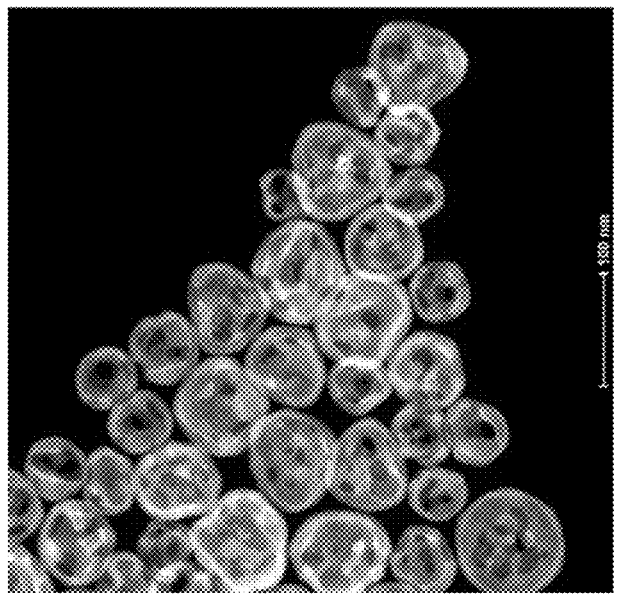
FIG. 5 shows the high-angle annular dark-field scanning transmission electron microscopy (HAADF-STEM) image of the hollow Au—Cu two-dimensional nanostructure prepared according to Example II(a).

The transmission electron microscopy (TEM) image shown in FIG. 3 and the high-angle annular dark-field scanning transmission electron microscopy (HAADF-STEM) measurements as shown in FIG. 5 further confirm Cu—Au two-dimensional nanostructures with hollow pores.

Figure 4:
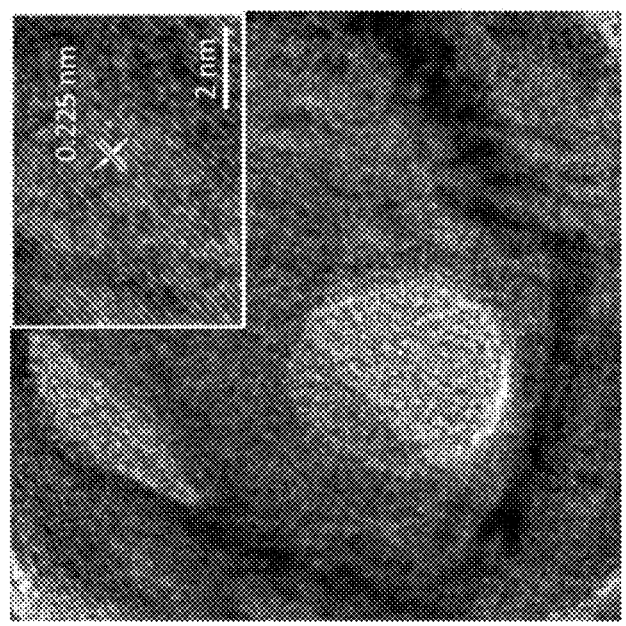
FIG. 4 shows a high-resolution TEM (HRTEM) image of the hollow Au—Cu two-dimensional nanostructure prepared according to Example II(a).

The high-resolution TEM (HRTEM) image shown in FIG. 4 of an individual hollow nanostructure reveals that it contains large crystalline domains. The fringes with a lattice spacing of 2.225 Å can be indexed to the (111) plane of face centered cubic (fcc) alloy Cu—Au nanostructures.

Figure 6:
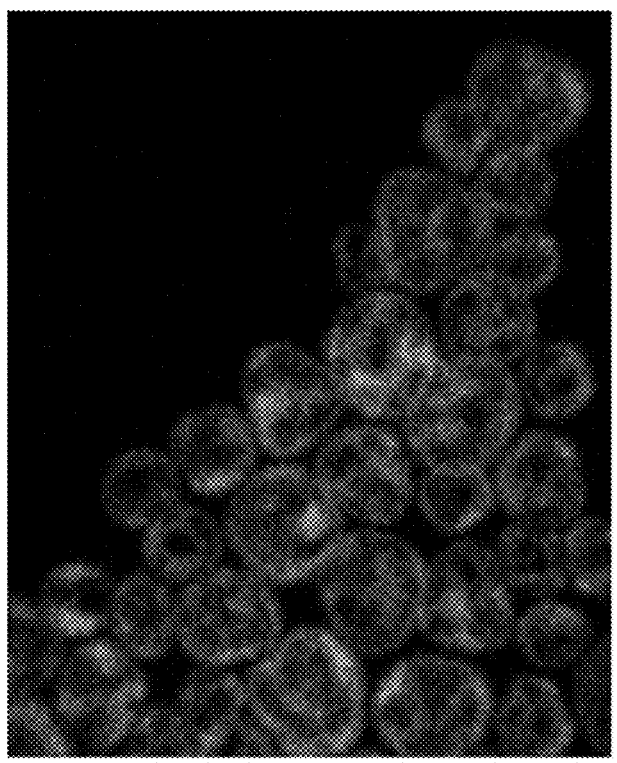
FIG. 6 shows an energy dispersive X-ray (EDX) mapping image of the Cu element of the hollow Au—Cu two-dimensional nanostructure prepared according to Example II(a).
Figure 7:
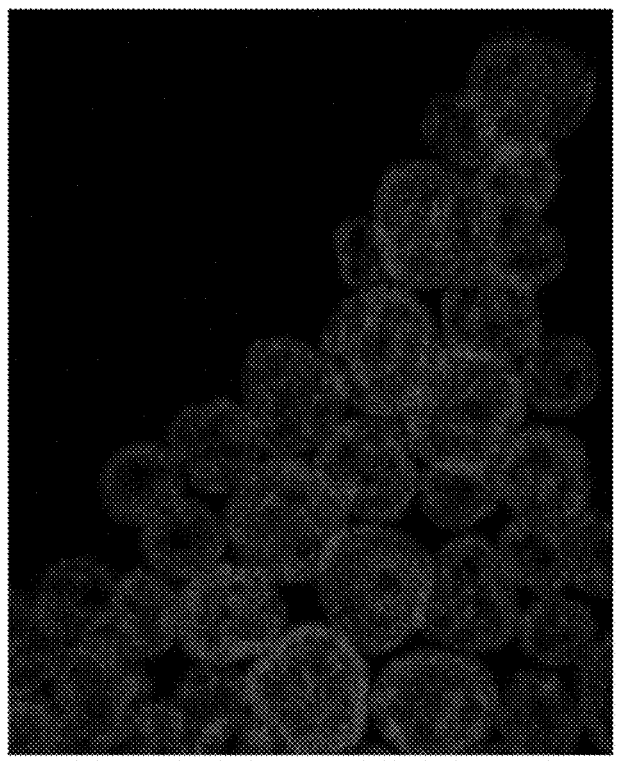
FIG. 7 shows an energy dispersive X-ray (EDX) mapping image of the Au element of the hollow Au—Cu two-dimensional nanostructure prepared according to Example II(a).

FIG. 5 shows the energy dispersive X-ray (EDX) mapping image of the hollow nanostructure. FIGS. 6 and 7 show the EDX mapping image of Cu element and the Au element, respectively. As shown in FIGS. 5-7, both Cu and Au are homogeneously distributed throughout the hollow nanostructures. This indicates that the Cu—Au hollow nanostructures are in an alloying phase.

Figure 8:
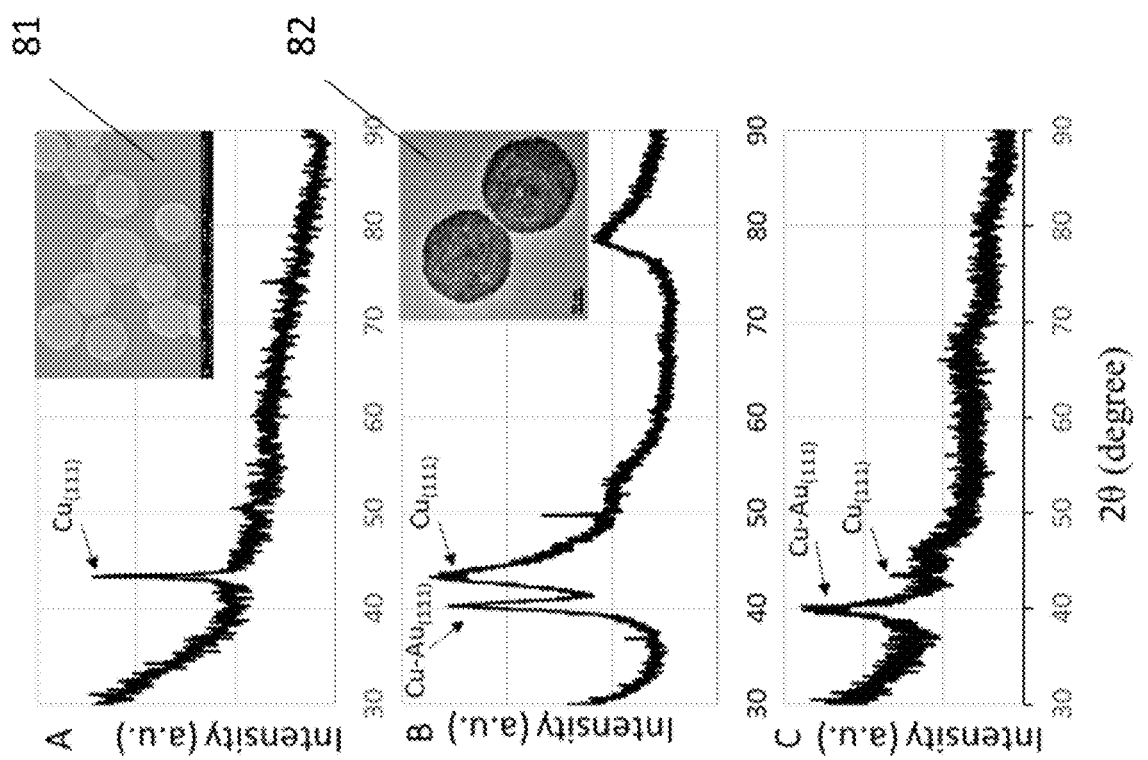
FIG. 8 shows the Cu—Au alloying evolution process of Example II(a) over time.

The transition of pure Cu fcc phase to alloy Cu—Au phase is further confirmed by X-ray diffraction technology. FIG. 8 shows the Cu—Au alloying evolution process of Example II(a) over time. In particular, FIG. 8 shows the Cu—Au alloying evolution process with decreasing intensity of Cu (111) diffraction peak and increasing intensity of the Cu—Au (111) diffraction peak.

Specifically, FIG. 8(a) shows that the pure Cu phase is obtained after injecting the Cu precursor at 300° C. for a reaction time of 60 minutes. The diffraction peak of Cu (111) is located at 43.7° as shown in FIG. 8(a).

After injecting Au precursors into the Cu nanosheet solution for a reaction time of 5 minutes at 120° C., FIG. 8(b) indicates the formation of the mixed phase because the diffraction peak of Cu—Au (111) appears at 40.80. The porous structures further confirms the galvanic replacement reaction occurring on the Cu sheet surface, as shown in inserted SEM image 81 and TEM image 82.

With the reaction time prolonged to 20 minutes, FIG. 8(c) indicates the diffraction peak of Cu (111) decreases to almost negligible, which means the product is now dominated by Cu—Au alloy phase. It was determined that under the same feeding concentration of Au precursors, the concentration of Cu was shown to decrease with the reaction time. The molar ratio of Cu to Au is about 3:1 when the reaction time is less than 5 minutes. When the reaction time prolongs to 40 minutes, the molar ratio of Cu to Au reduces to 1:3. The final molar ratio of Cu to Au will reach 1:8 after prolonging the reaction time to 60 minutes. Because the reaction rate of galvanic replacement increases with the concentration of Au precursors, the molar ratio of Cu to Au and the time required to form hollow structures was found to decrease with increased concentrations of Au precursors. Thus, the composition and phase of Cu—Au two-dimensional nanostructures may be adjusted by controlling the reaction time and the injecting concentration of Au precursors.

Figure 9A:
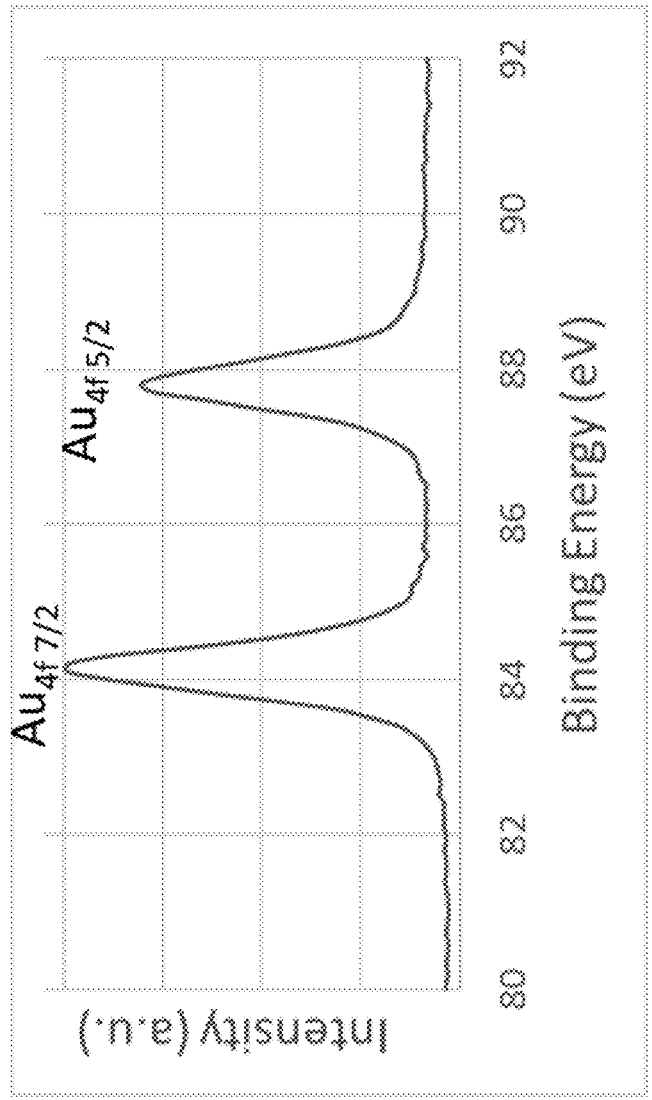
FIG. 9A shows a X-ray photoelectron spectroscopy (XPS) spectrum of the Au element of the hollow Au—Cu two-dimensional nanostructure prepared according to Example II(a).
Figure 9B:
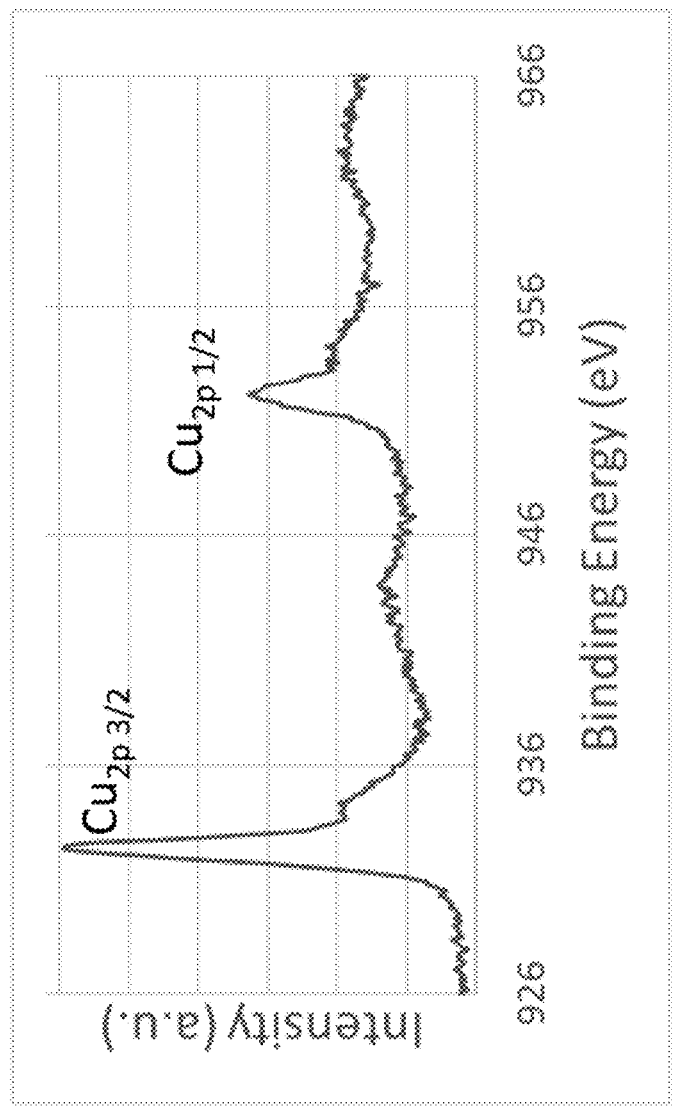
FIG. 9B shows a X-ray photoelectron spectroscopy (XPS) spectrum of the Cu element of the hollow Au—Cu two-dimensional nanostructure prepared according to Example II(a).

The electronic properties and surface composition of Cu—Au two-dimensional nanostructures was further examined by X-ray photoelectron spectroscopy (XPS). FIGS. 9A and 9B show well resolved peaks from Au 4f and Cu 2p in the XPS spectra. Both peaks of Cu 2p are positive shifted, i.e., 0.2 eV for Cu $2p_{1/2}$ and 0.3 eV for Cu $2p_{5/2}$. The change of binding energy is likely due to the electron transfer from Cu to Au and may also be explained by the work function difference of 4.65 eV for Cu (111) and 5.10 eV for Au (111). Furthermore, both peaks of Au $4f_{5/2}$ are also positive shifted, i.e., 0.2 eV for Au $4f_{7/2}$ and 0.13 eV for Au $4f_{5/2}$, respectively. This change is attributed to Au losing the electron to surface ligands. XPS analysis indicates no isolated Au or Cu phase existed in the two-dimensional nanostructure, which is in agreement with XRD results and EDX mapping images.

Figure 10:
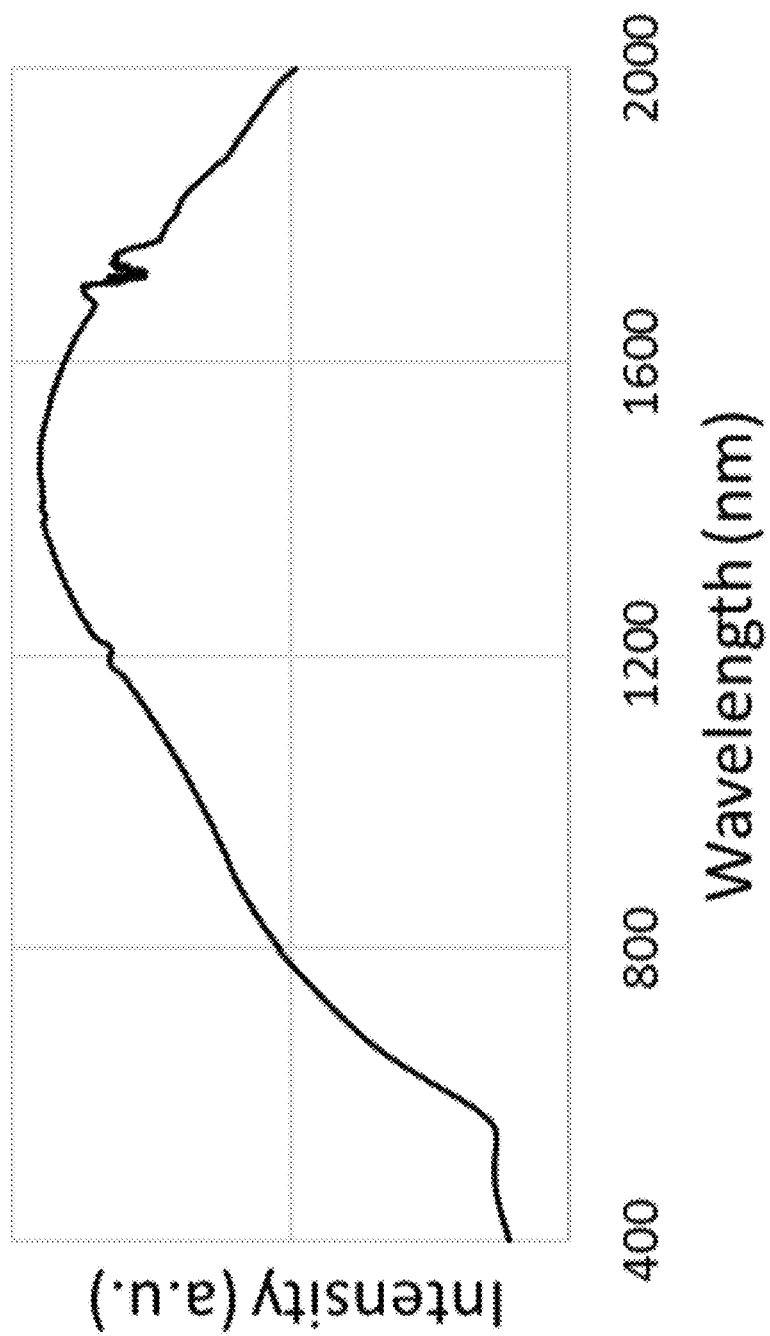
FIG. 10 shows a scattering spectrum of the hollow Au—Cu two-dimensional nanostructure prepared according to Example II(a).

The phase transition from pure Cu to Cu—Au alloy may also be visualized with the red-shift of their scattering spectrum. The absorption peak of pure Cu nanosheets is located at around 600 nm. After forming the Cu—Au two-dimensional hollow nanostructures, the extinction peak is red-shifted to infrared region (centered at 1500 nm), as shown in FIG. 10. This red shift may be attributed to the decrease in aspect ratio during galvanic replacement or the change of electronic structure due to phase transition. Cu—Au two-dimensional hollow nanostructures with unique optical property has potential applications in Surface Enhanced Raman Scattering (SERS), sensing, and biomedical fields.

Figure 11A:
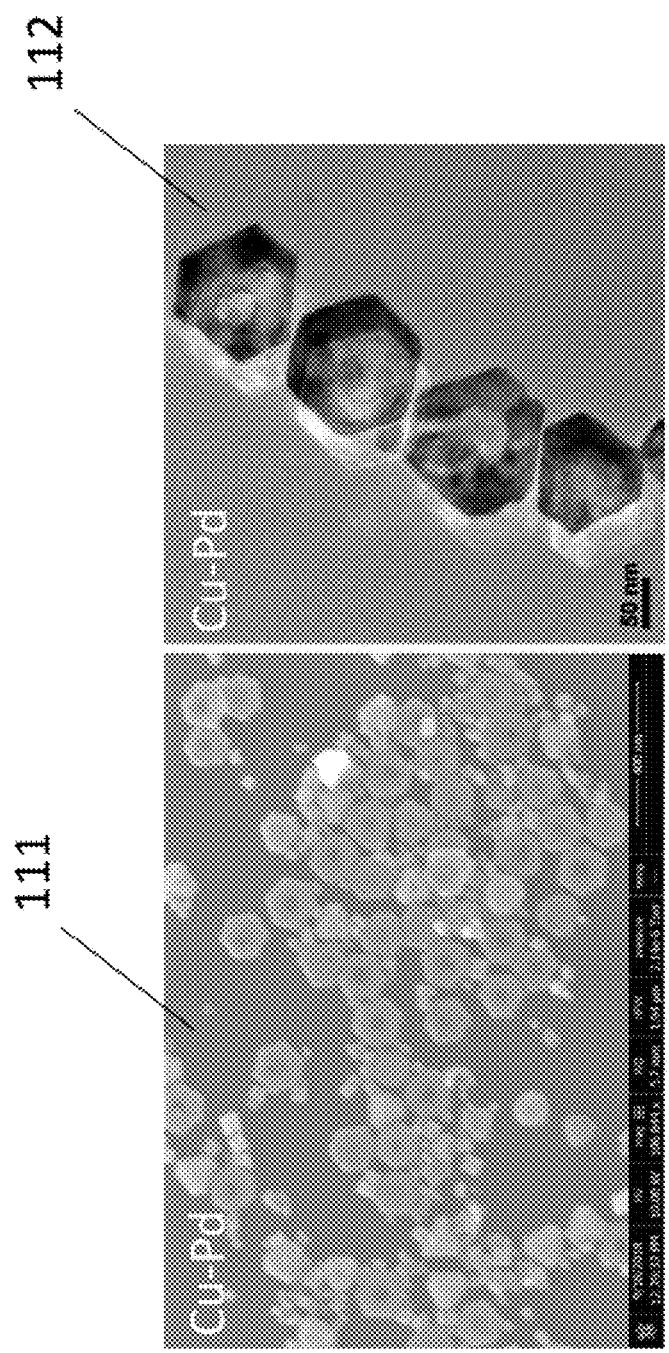
FIG. 11A shows SEM and TEM images of the Cu—Pd hollow nanostructures prepared according to Examples II(b).
Figure 11B:
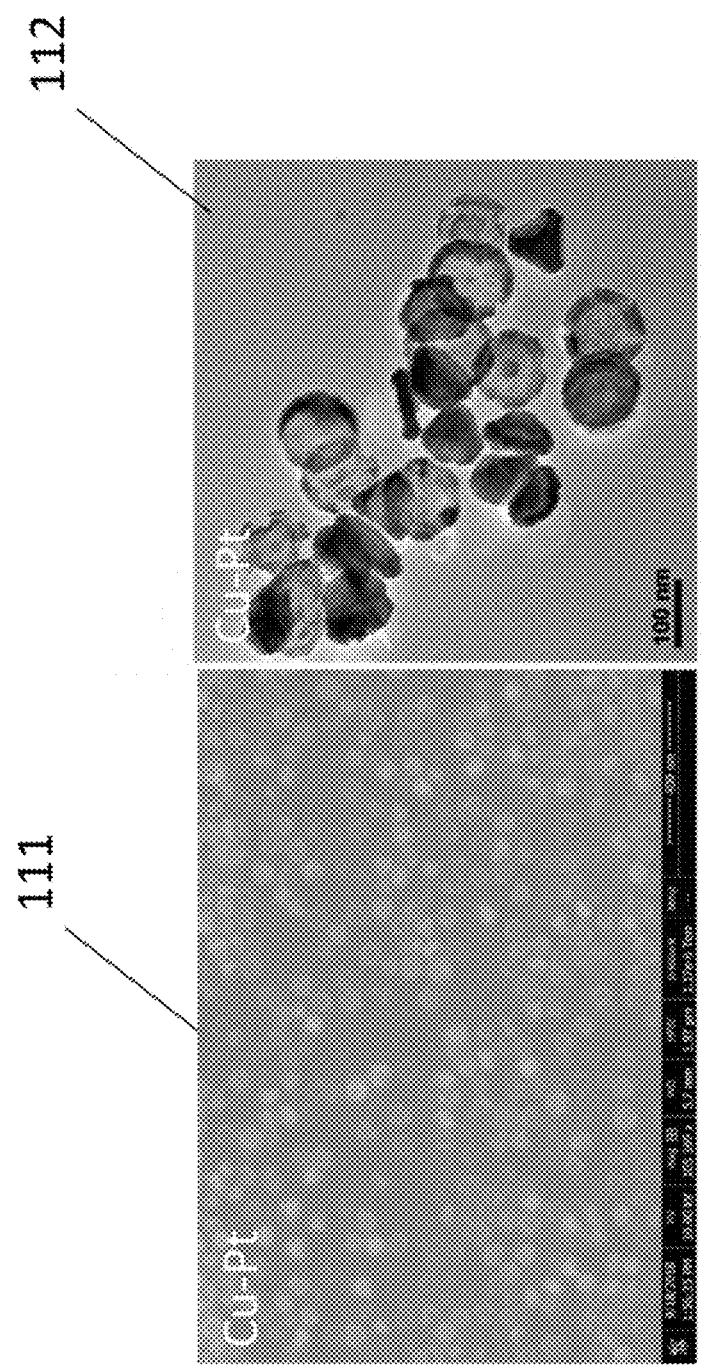
FIG. 11B shows SEM and TEM images of the Cu—Pt hollow nanostructures prepared according to Examples II(c).

FIGS. 11A and 11B show the SEM 111 and TEM 112 images of the Cu—Pd and Cu—Pt, hollow nanostructures, respectively, prepared according to Examples II(b) and II(c). In particular, these SEM and TEM images indicate that hollow Cu—Pd and Cu—Pt two-dimensional nanostructures are formed due to the higher oxidation potential of $Pd^{2+}/Pd$ (0.92 V) and $Pt^{2+}/Pt$ (1.20 V). The size of these two types of hollow nanostructures may be controlled from 50 nm to a few micrometers.

Figure 11C:
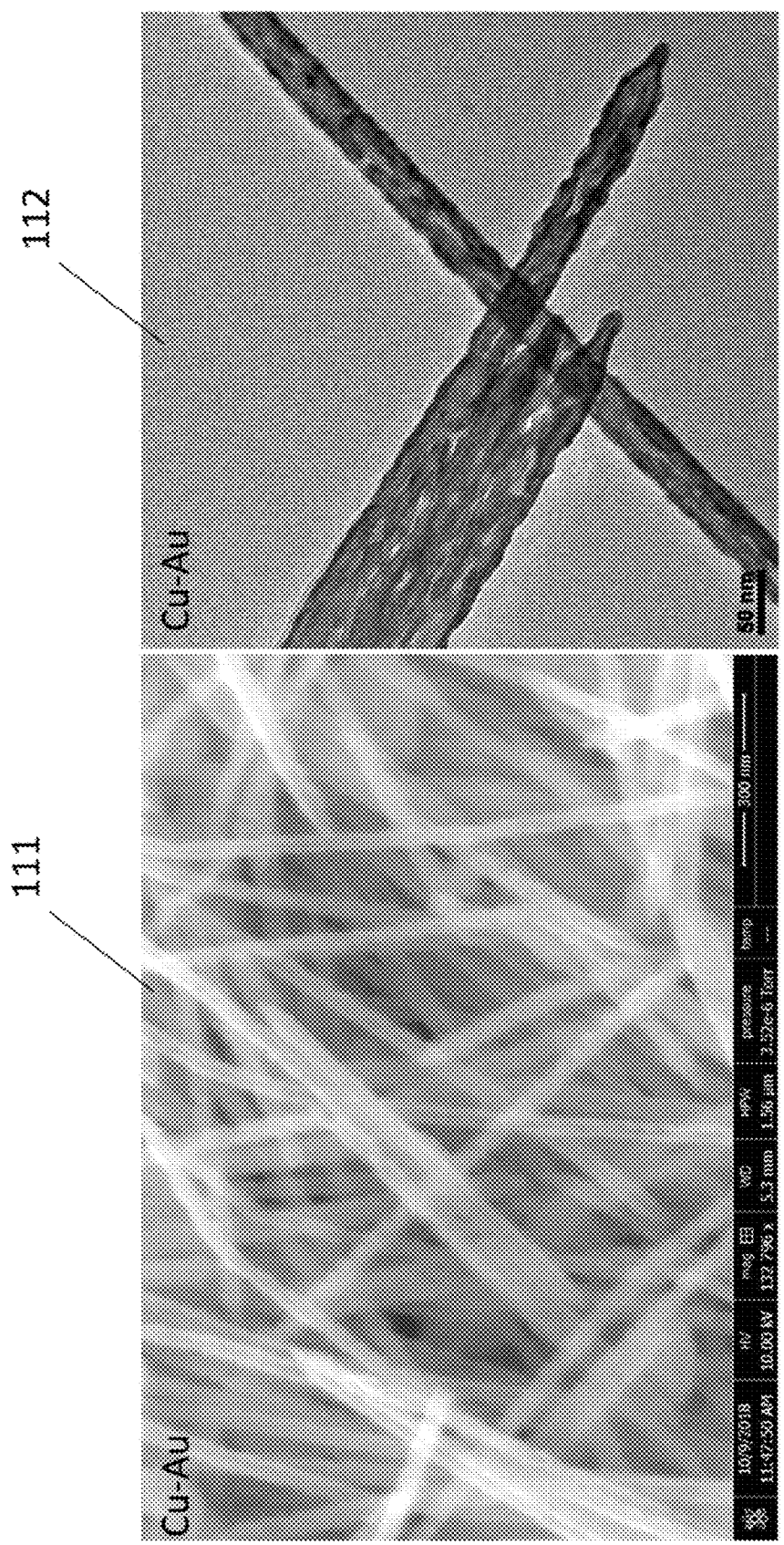
FIG. 11C shows SEM and TEM images of the Cu—Au hollow nanotubes prepared according to Examples II(d).

FIG. 11C shows SEM 111 and TEM 112 of Cu—Au nanotubes prepared according to Example II(d). In particular, the TEM image 111 indicates that the Cu—Au nanotubes have rough surfaces and sharp tips, which may act as high efficiency catalysts for reducing $CO_2$ or for use as a gas sensor.

The invention claimed is:

1. A method for preparing a hollow multi-metallic nanostructure, the method comprising:
   providing a copper complex solution comprising one or more copper complexes,
   heating the copper complex solution to provide a copper nanosheet solution, the copper nanosheet solution comprising a copper nanosheet consisting essentially of a plurality of copper atoms, and
   providing a combined solution by combining the copper nanosheet solution with a metal precursor solution comprising a metal precursor having second metal ions, wherein the copper nanosheet solution is combined with the metal precursor solution at temperature of between about 80 and 150 ° C. for a reaction time of between about 20 and 120 minutes in order to perform a synthetic strategy, the synthetic strategy comprising:
      replacing a portion of the plurality of copper atoms with a corresponding number of the second metal ions, and
      promoting copper atom diffusion to provide the hollow multi-metallic nanostructure having a ratio of copper atoms to second metal atoms from about 10:1 to 1:10,
   wherein the combined solution has an initial molar ratio of copper atoms to second metal ions of from about 5:1 to about 1:5.

2. The method according to claim 1, wherein the copper atoms have a first oxidation potential, and wherein the second metal ions are ions of a metal having a second oxidation potential, the second oxidation potential being greater than the first oxidation potential.

3. The method according to claim 2, wherein the second oxidation potential is at least about 0.6 V greater than the first oxidation potential.

4. The method according to claim 2, wherein the second metal is selected from the group consisting of gold, platinum, palladium, and combinations thereof.

5. The method according to claim 1, wherein the metal precursor is selected from the group consisting of chloroauric acid ($HAuCl_4$), palladium(II) acetylacetonate (Pd $(acac)_2$), chloroplatinic acid ($H_2PtCl_6$), combinations thereof, and hydrates thereof.

6. The method according to 1, wherein the synthetic strategy is a one-step synthetic strategy.

7. The method according to claim 1, wherein copper atom diffusion comprises copper atoms interior to the copper nanosheet diffusing to an exterior of the copper nanosheet.

8. A method for preparing a hollow multi-metal nanostructure, the method comprising:
   providing a copper nanosheet consisting essentially of copper atoms, wherein providing the copper nanosheet comprises:
      providing a copper complex solution comprising one or more copper complexes,
      heating the copper complex solution to provide a copper nanosheet solution, the copper nanosheet solution comprising the copper nanosheet;
   providing a metal precursor solution comprising second metal ions, wherein the second metal is different from copper and has an oxidation potential of at least 0.6 V greater than an oxidation potential of copper; and
   providing a combined solution by combining the copper nanosheet solution and the metal precursor solution at temperature of between about 80 and 150° C. for a reaction time of between about 20 and 120 minutes to replace one or more copper atoms of the copper nanosheet with the second metal ions and to form a hollow multi-metal nanostructure comprising copper and the second metal,
   wherein the hollow multi-metal nanostructure has a ratio of copper atoms to second metal ions from about 10:1 to 1:10, and
   wherein the combined solution has an intial molar ratio of copper atoms to second metal ions of from about 5:1 to about 1:5.

* * * * *